US006633457B1

(12) United States Patent
Lin et al.

(10) Patent No.: US 6,633,457 B1
(45) Date of Patent: Oct. 14, 2003

(54) ACTUATOR ASSEMBLY WITH ORTHOGONAL FORCE GENERATION

(75) Inventors: Huai Lin, Singapore (SG); Teck Seng Low, The Haceinda (SG); Zhimin He, Singapore (SG); Shixin Chen, Singapore (SG); Qinghua Li, Singapore (SG)

(73) Assignee: Data Storage Institute, Singapore (SG)

( * ) Notice: Subject to any disclaimer, the term of this patent is extended or adjusted under 35 U.S.C. 154(b) by 0 days.

(21) Appl. No.: 09/625,671

(22) Filed: Jul. 25, 2000

(51) Int. Cl.[7] .............................. G11B 21/08; G11B 5/55
(52) U.S. Cl. ..................................... 360/264.9; 360/265
(58) Field of Search ............................ 360/264.9, 265, 360/264.7, 264.3, 264.1, 264, 260, 240

(56) References Cited

U.S. PATENT DOCUMENTS

| 4,462,054 A | | 7/1984 | Dong et al. ............... 360/266.7 |
| 4,476,404 A | | 10/1984 | Bygdnes ....................... 310/27 |
| 4,620,252 A | | 10/1986 | Bauck et al. ............... 360/265 |
| 4,635,151 A | | 1/1987 | Hazebrouck ............. 360/265.1 |
| 4,960,474 A | * | 10/1990 | Nozawa et al. ............. 148/302 |
| 5,027,242 A | | 6/1991 | Nishida et al. ........... 360/246.8 |
| 5,267,110 A | * | 11/1993 | Ottesen et al. ........... 360/264.8 |
| 5,295,031 A | | 3/1994 | Wasson .................... 360/264.9 |
| 5,486,965 A | | 1/1996 | Yoshida et al. ............. 360/265 |
| 5,566,375 A | | 10/1996 | Isomura .................... 360/256.2 |
| 5,764,441 A | * | 6/1998 | Aruga et al. ................ 360/265 |
| 5,991,124 A | * | 11/1999 | Forbord ....................... 360/265 |
| 6,115,215 A | * | 9/2000 | Adams et al. ........... 360/264.4 |
| 6,225,712 B1 | * | 5/2001 | Miyamoto et al. ............. 310/12 |

FOREIGN PATENT DOCUMENTS

EP     333128 A2    9/1989

* cited by examiner

Primary Examiner—Julie Anne Watko
(74) Attorney, Agent, or Firm—Knobbe Martens Olson & Bear LLP

(57) ABSTRACT

An actuator assembly for positioning read/write heads above a data storage media comprises a pivotally mounted carriage arm assembly with a voice coil and a magnetic device having a plurality of poles for generating a magnetic field. The voice coil is positioned with its effective portions crossing through the magnetic field to generate at least one pair of driving forces in a direction substantially orthogonal to a seeking direction of the read/write heads. The carriage arm driven by said pair of forces has substantially no reacting force generated onto the pivot so that the servo bandwidth of the head positioning assembly can be improved and achieves a high degree of head positioning accuracy.

17 Claims, 6 Drawing Sheets

ACTUATOR ASSEMBLY WITH ORTHOGONAL FORCE GENERATION

FIELD OF THE INVENTION

The present invention relates to an actuator assembly for an information storage media. In particular, it relates to a rotary electromagnetic actuator assembly for use in positioning read/write heads on a data storage device.

BACKGROUND OF THE INVENTION

In information storage systems, for example, in a magnetic disk recording system, or a hard disk drive (HDD), magnetic read/write heads are used to read/write data information from/to the data storage disks. The disk surfaces are divided into a plurality of tracks or annular bands for storing data information. The read/write heads are supported close to the corresponding disk surfaces by a head positioning/turning assembly, e.g., an actuator assembly. The read/write heads are carried by the actuator assembly and are movable above the disk surface for reading/writing data information.

Recently, the hard disk drive industry has been placing considerable emphasis upon high magnetic recording density hard disk systems exhibiting (1) higher data storage capacity at lower cost per bit of stored data, and (2) high data storage throughput at lower power. As is well known, the bit recording density of disks is the product of the number of flux reversals per unit length of a track (i.e. linear bit density) multiplied by the number of tracks per inch (TPI). Presently, the commercial hard disk products in the market, which commonly employ a conventional planar moving-coil actuator assembly as shown in FIG. 1, generally have a track density of 6000~8000 TPI. The head positioning system of a commonly used HDD supported by the conventional actuator assembly has a cross-over frequency of only 500~700 Hz, which can only support the track density up to 12000~14000 TPI. Achieving high track density (25000 TPI or higher) is a major challenge for the designers of head positioning systems and corresponding servo systems.

A prior art moving-coil actuator assembly shown in FIG. 1 comprises a voice coil 1, a carriage arm 2, a suspension and head gimbal assembly (HGA) member 3 and a pivot member 4. Electromagnetic actuating force $F_A$ is generated at an end of the carriage arm 2 to actuate the head positioning assembly. Due to the non-coupled electromagnetic actuating force $F_A$ generated, there is an inherent reaction force $F_R$ exerted on the pivot member 4. This reaction force $F_R$ will excite a considerable and undesirable resonance vibration in the actuator assembly about the pivot member in a data track seeking direction. This vibration is called a Quasi-Rigid (QR) body vibration mode and is usually located at mid band frequency band, e.g., 4~6 KHz. The servo bandwidth of the head positioning assembly is therefore limited by this in-plane resonance vibration mode.

The prior art techniques and the corresponding problem inherently existed in conventional actuator systems as described in a variety of patents and publications. For example, although U.S. Pat. No. 4,476,404 to P. A. Bygdnes, et al., U.S. Pat. No. 4,635,151 to H. B. Hazebrouck, et al., U.S. Pat. No. 5,027,242 to H. Nishida, et al., and U.S. Pat. No. 5,566,375, disclose different techniques and methods to improve operating characteristics of rotary actuator systems, respectively, the constructions adopted and embodied in the corresponding patents will inherently excite the reaction force exerted on the pivot member. Thus, there is unexpected variation and deterioration of positioning characteristics of actuator system.

A similar approach to this problem was first disclosed in U.S. Pat. No. 4,620,252 issued Oct. 28, 1986 to R. C. Bauck, et al. There, a twin planar coil was first adopted. The twin coils are rigidly fixed and displaced symmetrically at the other end of the carriage of a head positioning mechanism. A similar approach to adopting a twin planar coil attached to the other end of a carriage arm was also disclosed in U.S. Pat. No. 5,486,965 to Yoshida, et al. However, it is noticed that the reaction force is still exerted on the pivot member due to the fact that the actuating force generated by the other two effective portions of the twin coil is not perpendicular to the seeking direction of the actuator system such as to excite resonance vibration in the actuator system within mid-band of frequency. Also, it is a complex structure in a rotary actuator system and is likely to have many difficulties in manufacturing and assembly.

Another similar approach to this problem was disclosed in one of the embodiments of U.S. Pat. No. 5,295,031 to K. G. Wasson, et al. There, a moving-magnet type construction is used to couple a torque into a pivotally mounted arm member and the unexpected reaction force imposed at the pivot shaft and bearing associated therewith are substantially minimized to improve the accuracy of positioning. However, it is noticed that there is an inherently considerable bias force and hysteresis in the moving-magnet type actuator systems. Further, exposure of magnets in the moving-magnet actuators lead to many difficulties in manufacturing and assembly processes.

The foregoing and other objects, features and advantages of the invention will be better understood from the following more detailed description and appended claims.

SUMMARY OF THE INVENTION

It is a first aspect of the present invention that the actuator assembly disclosed can generate pairs of forces substantially orthogonal to the moving direction of the read/write heads and therefore generate substantially no reaction force to the pivot member of the carriage arm assembly, so that the QR body vibration mode can be substantially suppressed and an improved servo bandwidth can be obtained.

It is a second aspect of the present invention that the actuator assembly disclosed has a voice coil and corresponding magnets which are structurally as simple as conventional voice coil and magnets, and therefore only limited additional cost is added in manufacturing by an actuator assembly of the present invention.

According to the first and second aspects recited above, the present invention discloses an actuator assembly for positioning a plurality of read/write heads above an information storage media, such as a data storage disk. The actuator assembly comprises a carriage arm assembly movably mounted on a pivot and having a voice coil mounted thereon, and a magnetic device having a plurality of poles for generating a magnetic field. The voice coil further comprises at least one effective portion for interacting with the magnetic field to generate at least one pair of driving forces in a direction substantially orthogonal to a moving direction of the read/write heads. The magnetic field further comprises a first magnetic region and a second magnetic region, the second magnetic region being in a direction opposite to the first magnetic region and the voice coil being placed with the at least one effective portion crossing through the first and the second magnetic regions.

The actuator assembly of the present invention is structurally simple for low cost manufacturing and effectively improves the read/write heads positioning accuracy in a data storage system.

DETAILED DESCRIPTION OF THE PREFERRED EMBODIMENTS

Figure 1:
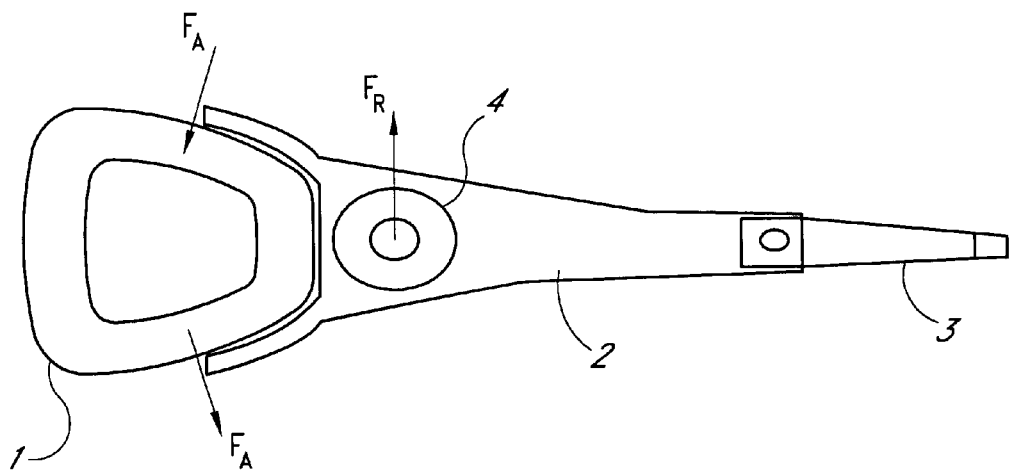
FIG. 1 is a schematic view of a prior art actuator assembly.
Figure 2:
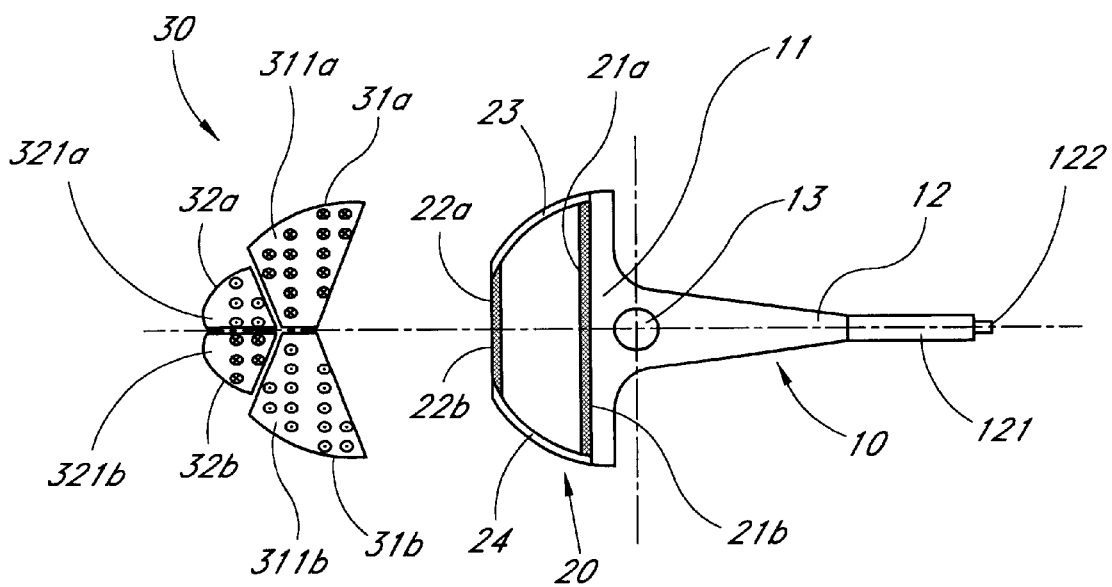
FIG. 2 is a top view showing the separate elements of the actuator assembly according to a first embodiment of the present invention.

Referring now to FIG. 2, an actuator assembly according to a preferred embodiment of the present invention comprises a carriage arm assembly having a carriage arm 10 and a voice coil 20. The carriage arm 10 comprises a first end 11 and a second end 12. A plurality of read/write heads 122 are mounted onto the carriage arm 10 through a suspension 121. The carriage arm 10 carrying the read/write heads 122 is adapted to be pivotally mounted and is movable about a pivot 13, so that the read/write heads 122 can be moved and positioned above the disk 40 (FIG. 4) on a predetermined location for reading/writing data.

The voice coil 20, being substantially a quadrilateral planar shape in this embodiment, comprises a first effective portion 21, a second effective portion 22, a first connective portion 23 and a second connective portion 24. The first effective portion 21 further comprises a first effective section 21a and a second effective section 21b. The second effective portion further comprises a third effective section 22a and a fourth effective section 22b. The term "effective portion" here refers to the voice coil portions interacting with the corresponding magnetic fields for generating electromagnetic actuating forces. The term "connective portion" here refers to the voice coil portions placed out of the magnetic field; hence no electromagnetic actuating forces are generated on these portions. The connective portion only serve the purpose to electrically connect effective portions to provide the necessary electric circuits in the voice coil 20.

Figure 7:
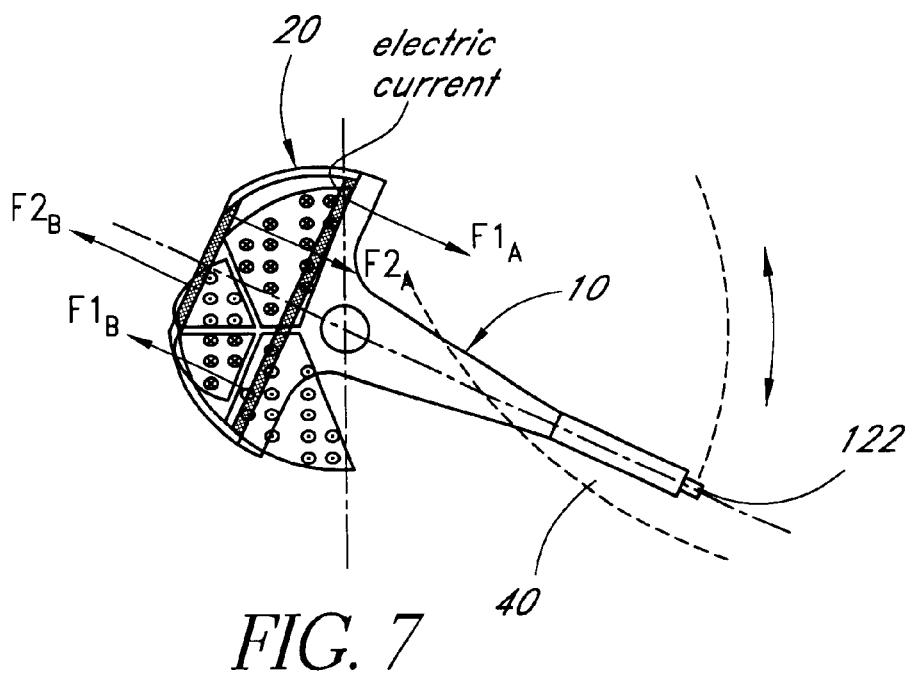
FIG. 7 is an A—A cross sectional view of FIG. 3 when the carriage arm is in a second position.
Figure 6:
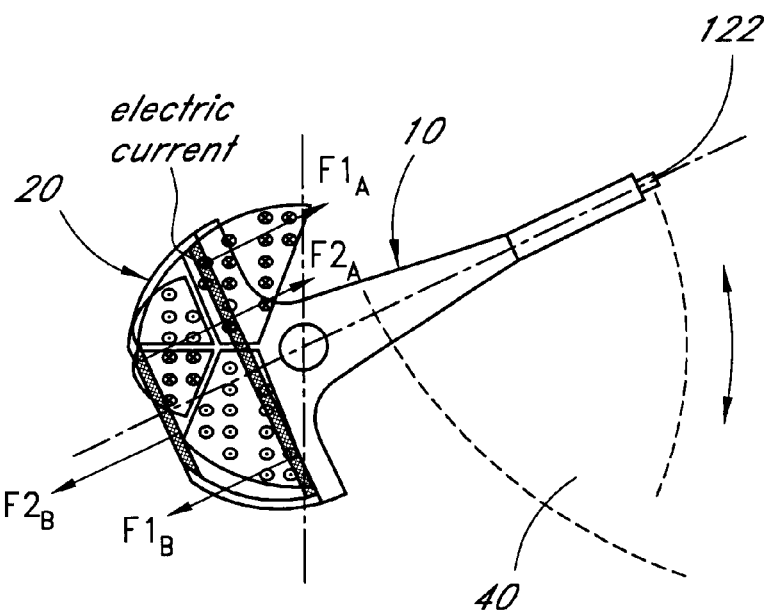
FIG. 6 is an A—A cross sectional view of FIG. 3 when the carriage arm is in a first position.

The voice coil 20 is adapted to be fixed on to the carriage arm 10 to form the carriage arm assembly. The carriage arm assembly is mounted on the pivot 13 and is movable between a first position corresponding to a first predetermined disk track and a second position corresponding to a second predetermined disk track, as shown in FIGS. 6 and 7, respectively.

A magnetic device 30 comprises a plurality of permanent magnets for generating respective magnetic fields. In this embodiment, the magnetic device 30 comprises four permanent magnets 31a, 31b, 32a and 32b defining four magnetic regions 311a, 311b, 321a and 321b, respectively. Each of the polarity of the above permanent magnets is arranged in an alternating configuration such that the permanent magnets 31a, 32b have a first polarity and the permanent magnets 31b, 32a have a second polarity opposite to the first polarity. As shown in FIG. 2, the polarity of permanent magnets 31a and 32b is in a direction into the paper plane, and the polarity of the permanent magnets 31b and 32a is in a direction coming out of the paper plane.

Figure 3:
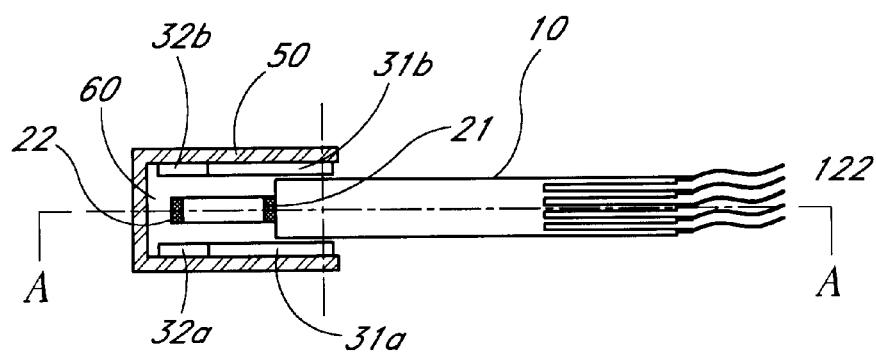
FIG. 3 is a front view of the actuator assembly according to the first embodiment of the present invention.
Figure 4:
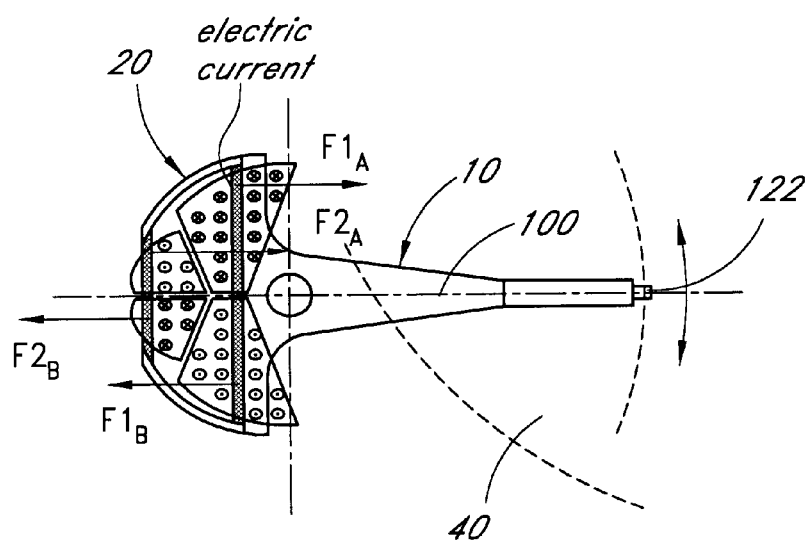
FIG. 4 is an A—A cross sectional view of FIG. 3.
Figure 5:
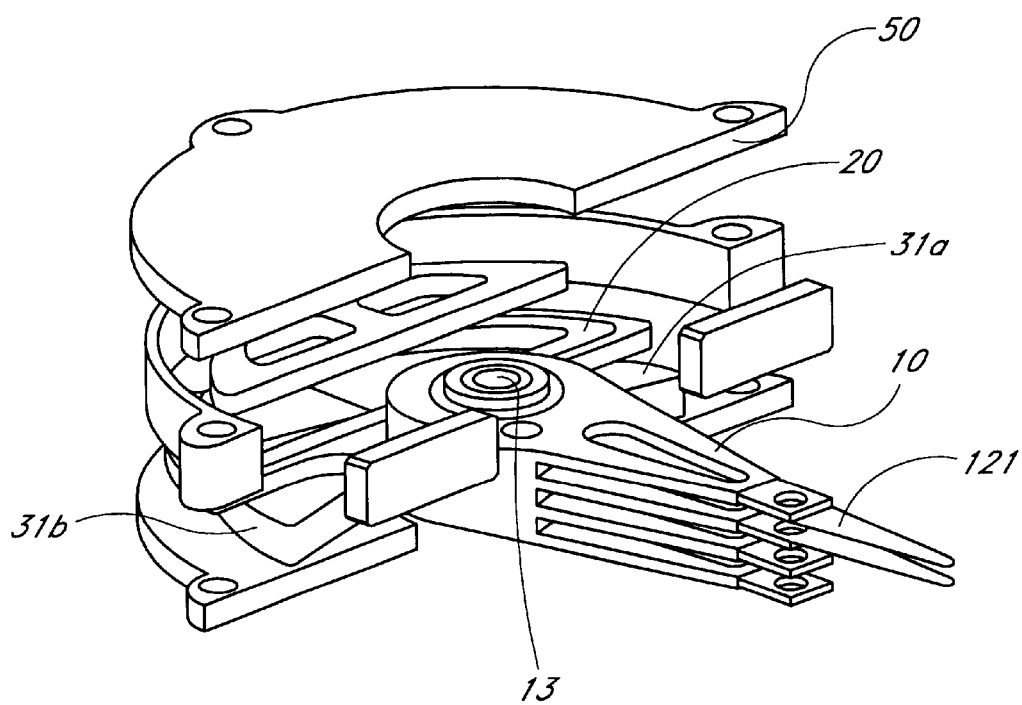
FIG. 5 is an isometric view of FIG. 3.

Referring now to FIGS. 3, 4 and 5, two pairs of permanent magnets 31a, 32a, 31b and 32b are fixed on to a yoke 50. An air gap 60 is therefore formed to generate a magnetic field, defining four magnetic regions 311a, 311b, 321a and 321b with respective polarities shown in FIG. 4. The carriage arm assembly is pivotally fixed on to the pivot 13 in such a position that the effective sections 21a, 21b, 22a and 22b of the voice coil 20 are positioned crossing through the magnetic regions 311a, 311b, 321a and 321b, respectively. Preferably, the geographical dimensions of the first and second effective sections 21a and 21b are substantially identical, and those of the third and fourth effective sections 22a and 22b are substantially identical. The orientations of the effective sections 21a, 21b, 22a and 22b are substantially perpendicular to a line 100 connecting the pivot 13 and the read/write heads 122.

As shown in FIG. 4, when an electric current is applied to the voice coil 20 in a direction as shown, a first electromagnetic force $F1_A$ will be generated in a direction substantially orthogonal to the seeking direction of the read/write heads 122. Similarly, a second electromagnetic force $F1_B$, a third magnetic force $F2_A$ and a fourth magnetic force $F2_B$ are generated simultaneously.

Accordingly, the first magnetic force $F1_A$ and the second magnetic force $F1_B$ are substantially identical in value, but in the directions opposite to each other. The third magnetic force $F2_A$ and the fourth magnetic force $F2_B$ are also substantially identical in value, but in opposite directions to each other. In this embodiment, $F1_A$ and $F2_A$ are in the same direction, and $F1_B$ and $F2_B$ are in the same direction.

The magnetic forces $F1_A$, $F1_B$ form a pure torque to the carriage arm assembly and hence generate substantially no reaction force to the pivot 13. Similarly, the magnetic forces $F2_A$, $F2_B$ form a pure torque to the carriage arm assembly, and hence generate substantially no reaction force to the pivot 13.

The permanent magnets 31a, 31b, 32a and 32b may be constructed from four magnetic pieces of magnets with one polarity per piece, or two magnetic pieces having two polarities per piece, or one magnetic piece having four polarities per piece. The material of the permanent magnet may be rare earth permanent magnet material such as NdFeB or SmCo based materials.

Figure 8:
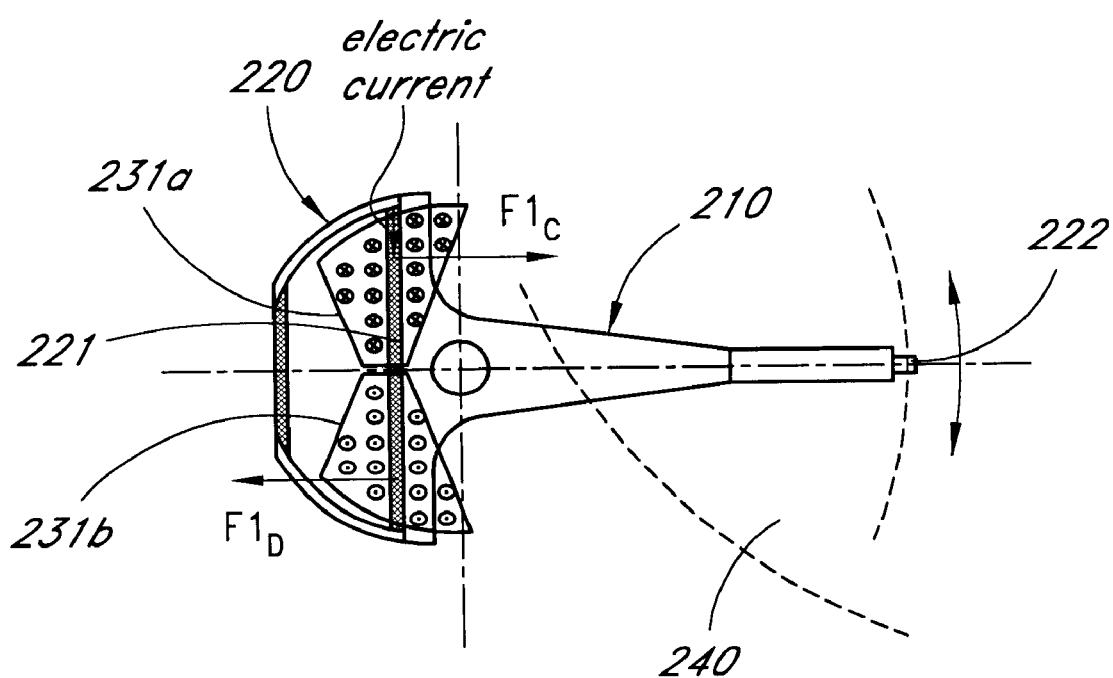
FIG. 8 is a top view of the actuator assembly according to a second embodiment of the present invention.

Referring now to FIG. 8, a second embodiment of the actuator assembly of the present invention comprises a magnetic device having one pair of permanent magnets 231a and 231b, and a voice coil 220 mounted on a carriage arm assembly 210 with one effective portion 221 placed crossing through the pair of permanent magnets 231a and 231b. A pair of electromagnetic actuating forces $F1_C$, $F1_D$ can be generated on the effective portion 221 of the voice coil 220 and the forces are orthogonal to the seeking direction to the read/write heads 222. A pure torque is therefore applied to the carriage arm assembly 210 to carry the read/write heads 222 above the disk 240.

Figure 9:
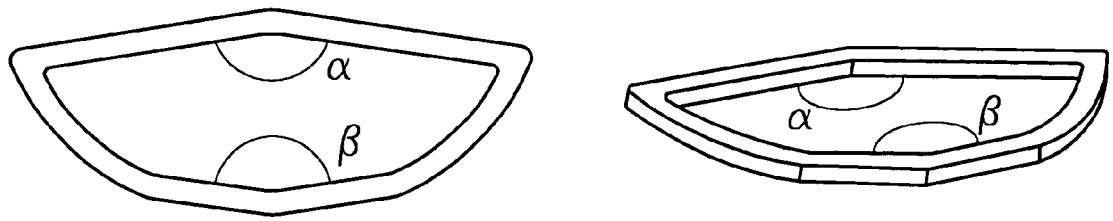
FIG. 9 is top and isometric views showing a variation of the voice coil of the actuator assembly according to the present invention.
Figure 10:
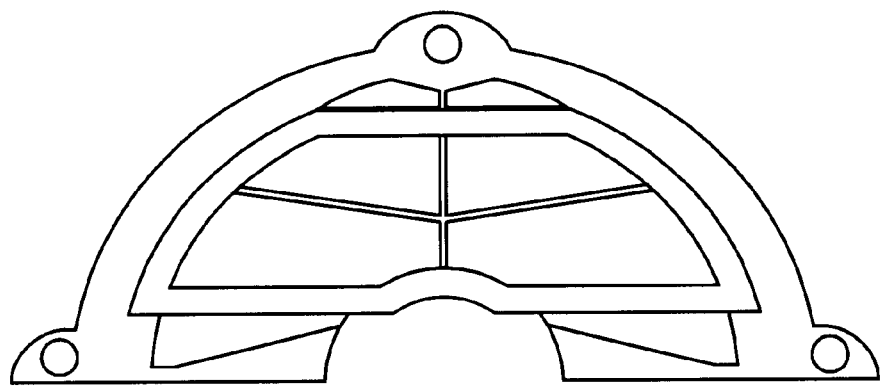
FIG. 10 is a top view showing the another variation of the voice coil of the actuator assembly according to the present invention.

Dependent on the design of the actuator assembly, the shape of the voice coil can be varied. FIG. 9 and FIG. 10 show a variation of the voice coil of the actuator according to the present invention. The two pairs of effective portions are connected through included angles α and ββ. To achieve the substantial orthogonal force generation, angles αα and ββ may not be exactly equal to, but close to, 180 degrees. FIG. 10 shows another variation of the voice coil of the actuator according to the present invention. The voice coil comprises a small partial section along or near the outer diameter of the pivot member. The majority of the effective portions of the voice coil are the same as the first embodiment described above, and serve the purpose to generate driving forces in a direction substantially orthogonal to the seeking direction of the read/write heads.

While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the invention.

What is claimed is:

1. An actuator assembly for positioning a plurality of read/write heads above an information storage media, comprising:
    a carriage arm assembly movably mounted on a pivot and having a voice coil mounted on one end and a plurality of read/write heads mounted on the other end; and
    a magnetic device having a plurality of poles adapted to generate a magnetic field;
    wherein the voice coil comprises one effective portion adapted to interact with the magnetic field and to generate one pair of driving forces in a direction substantially orthogonal to a moving direction of the read/write heads;
    wherein the magnetic device further comprises a first magnetic region and a second magnetic region being located across from the pivot, the second magnetic region having a polarity in a direction opposite to the first magnetic region, and the voice coil being positioned with the effective portion crossing through the first and second magnetic regions.

2. The actuator assembly as claimed in claim 1, wherein the carriage arm assembly is pivotally mounted through its center of mass.

3. The actuator assembly as claimed in claim 1, wherein the voice coil is a planar voice coil having a voice coil plane.

4. The actuator assembly as claimed in claim 3, wherein the voice coil plane is parallel to a seeking plane of the read/write heads of the carriage arm assembly.

5. The actuator assembly as claimed in claim 1, wherein the magnetic device is formed from rare earth permanent magnetic materials.

6. The actuator assembly as claimed in claim 5, wherein the rare earth permanent magnetic materials comprise NdFeB or SmCo based materials.

7. The actuator assembly as claimed in claim 1, wherein the magnetic device has alternatively arranged magnetic fields with two south poles and two north poles, and the voice coils comprises two effective portions for interacting with the alternatively arranged magnetic fields.

8. The actuator assembly as claimed in claim 1, further comprising a yoke for supporting the poles of the magnetic device and providing magnetic paths for fluxes generated by the magnetic device.

9. The actuator assembly as claimed in claim 8, wherein the yoke comprises a top plate and a bottom plate defining a space for containing the poles of the magnetic device and the voice coil.

10. The actuator assembly as claimed in claim 1, wherein the effective portion of the voice coil is symmetrically placed coaxially about a longitudinal axis of the carriage arm assembly.

11. The actuator assembly as claimed in claim 10, wherein the longitudinal axis connects the read/write heads and the pivot of the carriage arm.

12. The actuator assembly as claimed in claim 1, wherein the effective portion of the voice coil comprises two effective sections configured as an included angle.

13. The actuator assembly as claimed in claim 12, wherein the included angle is substantially 180°.

14. The actuator assembly of claim 1, wherein the magnetic device further comprises a third magnetic region and a fourth magnetic region being located across from the pivot, the fourth magnetic region having a polarity in a direction opposite to the third magnetic region, and wherein the voice coil further comprises an additional effective portion configured to generate one pair of driving forces in a direction substantially orthogonal to a moving direction of the read/write heads across the information storage medium, the voice coil being positioned with the additional effective portion crossing through the third and fourth magnetic regions.

15. An actuator assembly for positioning a plurality of read/write heads above an information storage media, comprising:
    a carriage arm assembly movably mounted on a pivot and having a voice coil mounted on one end and a plurality of read/write heads mounted on the other end; and
    a magnetic means for applying a torquing force to the carriage arm assembly, the magnetic means comprising a first magnetic region and a second magnetic region, the second magnetic region having a polarity in a direction opposite to the first magnetic region;
    wherein the voice coil comprises an effective portion generating one pair of driving forces in a direction substantially orthogonal to a moving direction of the read/write heads, and the voice coil being positioned with the effective portion crossing through the first and second magnetic regions.

16. An actuator assembly and information storage medium for positioning a plurality of read/write heads above the information storage medium, comprising:
    an information storage medium;
    a carriage arm assembly movably mounted on a pivot and having a voice coil mounted on one end and a plurality of read/write heads mounted on the other end;
    a magnetic device having a plurality of poles adapted to generate a magnetic field;
    wherein the voice coil comprises one effective portion adapted to interact with the magnetic field and to generate one pair of driving forces in a direction substantially orthogonal to a moving direction of the read/write heads across the information storage medium;
    wherein the magnetic device further comprises a first magnetic region and a second magnetic region, the second magnetic region having a polarity in a direction opposite to the first magnetic region, and the voice coil being positioned with the effective portion crossing through the first and second magnetic regions.

17. A method of positioning a plurality of read/write heads above an information storage medium, wherein the read/write heads are positioned at one end of a carriage arm moveably mounted on a pivot, the other end of the carriage arm having a voice coil, the method comprising:
    rotationally moving the information storage medium;
    defining a first magnetic region and a second magnetic region, the second magnetic region having a polarity in a direction opposite to the first magnetic region;

providing the voice coil with an effective portion configured to generate one pair of driving forces in a direction substantially orthogonal to a moving direction of the read/write heads;

arranging the effective portion so as to cross through the first and second magnetic regions; and applying an electric current to the voice coil so that a torquing force carries the read/write heads to a predetermined position above the moving information storage medium.

* * * * *